(12) United States Patent
Ananthesh

(10) Patent No.: US 8,401,415 B2
(45) Date of Patent: Mar. 19, 2013

(54) IMAGE FORMING DEVICE TO PROCESS JOB USING SET-UP ENTRIES OF OTHER IMAGE FORMING DEVICES AND METHOD THEREOF

(75) Inventor: Hebbar Ananthesh, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 559 days.

(21) Appl. No.: 11/962,769

(22) Filed: Dec. 21, 2007

(65) Prior Publication Data

US 2008/0152376 A1 Jun. 26, 2008

(30) Foreign Application Priority Data

Dec. 22, 2006 (KR) .................. 10-2006-0133117

(51) Int. Cl.
*G03G 15/00* (2006.01)
*G06F 15/167* (2006.01)
(52) U.S. Cl. ............. 399/82; 399/81; 399/411; 709/216
(58) Field of Classification Search .............. 399/81–83, 399/85, 411; 709/216
See application file for complete search history.

(56) References Cited

U.S. PATENT DOCUMENTS 7,068,165 B2 * 6/2006 Takahashi et al. ....... 340/539.26

FOREIGN PATENT DOCUMENTS

| JP | 2003-15852 | 1/2003 |
| KR | 2005-65993 | 6/2005 |

* cited by examiner

*Primary Examiner* — Joseph S Wong
(74) *Attorney, Agent, or Firm* — Stanzione & Kim, LLP

(57) ABSTRACT

An image forming device to receive set-up entry data of external image forming devices, includes an interface portion to relay communications with at least one external image forming device; a communication portion to request set-up entry data to the at least one external image forming device; and a central processing unit to execute a job according to the set-up entry data when the requested set-up entry data is received through the interface portion. The communication portion searches the external image forming devices using a broadcast scheme and requests the set-up entry data according to the search result. Accordingly, functions of the image forming device can be utilized with more convenience and efficiency.

19 Claims, 5 Drawing Sheets

US 8,401,415 B2

IMAGE FORMING DEVICE TO PROCESS JOB USING SET-UP ENTRIES OF OTHER IMAGE FORMING DEVICES AND METHOD THEREOF

CROSS-REFERENCE TO RELATED APPLICATIONS

This application claims priority under 35 U.S.C. §119 (a) from Korean Patent Application No. 2006-133117 filed on Dec. 22, 2006 in the Korean Intellectual Property Office, the contents of which is incorporated herein by reference in its entirety.

BACKGROUND OF THE INVENTION

1. Field of the Invention

The present general inventive concept relates to an image forming device and a job processing method of the image forming device. More particularly, the present general inventive concept relates to an image forming device to process a job by receiving set-up entries stored to other image forming devices, and a job processing method of the image forming device.

2. Description of the Related Art

With advances within the electronic technology, various image forming devices have been developed and are widespread. For instance, image forming devices such as printers, copiers, scanners, and fax machines are being used. Recently, multifunction printers with a combination of functions are also utilized.

Today, the image forming devices execute more diverse functions. For instance, the image forming device having a scanning function provides various functions such as a scan to E-mail function, a scan to PC application function, a scan to SMB function, a scan to FTP function, and a scan to HTTP function in addition to the basic scanning function.

To execute those functions, a user needs to set various additional information. For instance, for the scan to E-mail job, the user needs to set diverse additional information such as an E-mail recipient address, recipient name, sender address, E-mail format, and the like. The set information for a specific job is referred to as set-up entry data. To repeat the same job, the set-up entry data stored in advance can be utilized.

Meanwhile, while the set-up entry data is stored to one image forming device, when the user intends to execute a specific job using another image forming device, new set-up entry data should be set.

To make use of the set-up entry data of the former image forming device, it is required to download the set-up entry data at a host PC where a driver program of the former image forming device is installed and to transfer the downloaded data to the another image forming device. Since the data is transmitted and received the host PC, it takes quite a long time. Particularly, if a number of new image forming devices are connected via the Internet, the set-up entry data should be transferred to the image forming devices individually. As a result, the user experiences an inconvenience.

SUMMARY OF THE INVENTION

The present general inventive concept provides an image forming device to process a job by use of the existing set-up entry data by requesting and receiving the set-up entry data from other image forming devices if necessary, without having to input new set-up entry data for a specific job, and a job processing method of the image forming device.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an image forming device including an interface portion to relay communications with at least one external image forming device, a communication portion to request set-up entry data to the at least one external image forming device and a central processing unit to execute a job according to the set-up entry data when the requested set-up entry data is received through the interface portion.

The communication portion may generate an address request signal to request an image forming device address and broadcast the generated address request signal through the interface portion.

The image forming device may further include an output unit to display a list of addresses of external image forming devices which transmit the response signals, when the response signals for the address request signal are received through the interface portion; and a user interface portion.

The output unit may display a list of addresses of external image forming devices having a same function as the image forming device among the external image forming devices which transmit the response signals.

The communication portion may send a set-up entry list request signal to an external image forming device having a selected address when the address is selected from the list, and the output unit may display a set-up entry list according to received data when the data relating to the set-up entry list is received in response to the set-up entry list request signal.

When one set-up entry is selected from the displayed set-up entry list through the user interface portion, the communication portion may send a request signal for the selected set-up entry to an external image forming device of the selected address.

When one address is selected from the list through the user interface portion and a set-up entry name is input, the communication portion may send a request signal for set-up entry data of the input set-entry name to an external image forming device having the selected address.

The image forming device may further include a storage unit to store addresses of external image forming devices that are pre-registered. In this case, the communication portion may send the set-up entry list request signal to the external image forming devices having the addresses stored to the storage unit.

The communication portion may send the set-up entry list request signal for a same type external image forming device as the image forming device among the external image forming devices having the addresses stored to the storage unit.

The image forming device may further include an output unit to display the set-up entry list according to the received data, when data of the set-up entry list is received in response to the set-up entry list request signal and a user interface portion. In this case, when at least one set-up entry is selected from the displayed set-up entry list through the user interface portion, the communication portion may send a request signal for the selected set-up entry data to an external image forming device having the stored address.

The image forming device may further include a storage unit to store addresses of external image forming devices that are pre-registered and a user interface portion to receive a set-up entry name. In this case, the communication portion may send a request signal for set-up entry data having the input set-up entry name to an external image forming device having the address stored to the storage unit.

The image forming device may be a multifunction printer capable of executing a plurality of jobs. When one of the jobs is selected, the communication portion may request set-up entry data of the selected job to the at least one external image forming device.

The foregoing and/or other aspects and utilities of the general inventive concept may also be achieved by providing a job processing method of an image forming device including requesting set-up entry data to at least one external image forming device; and (b) when the set-up entry data is received, processing a job according to the received set-up entry data.

The requesting operation may include broadcasting an address request signal to request addresses of image forming devices; when response signals for the address request signal are received, detecting addresses of external image forming devices which transmit the response signals, generating and displaying a list of the detected addresses, when one of the addresses is selected from the list, sending a set-up entry list request signal to an external image forming device of the selected address, receiving data relating to a set-up entry list in response to the set-up entry list request signal, displaying the set-up entry list according to the received data and when one set-up entry is selected from the displayed set-up entry list, sending a request signal for the selected set-up entry data to an external image forming device of the selected address.

The requesting operation may include broadcasting an address request signal to request addresses of image forming devices, when response signals for the address request signal are received, detecting addresses of external image forming devices which transmit the response signals, generating and displaying a list of the detected addresses, when one address is selected from the list, receiving a set-up entry name and sending a request signal for set-up entry data of the input set-up entry name to an external image forming device of the selected address.

The list of the detected addresses, which is generated and displayed, may be a list relating to external image forming devices having a same function as the image forming device.

The requesting operation may include sending a set-up entry list request signal to external image forming devices having pre-registered addresses, receiving data relating to a set-up entry list in response to the set-up entry list request signal, displaying the set-up entry list according to the received data, and when a set-up entry is selected from the displayed set-up entry list, sending a request signal for the selected set-up entry data to an external image forming device of the selected address.

The sending the set-up entry list request signal may include transmitting the set-up entry list request signal to an external image forming device having a same function as the image forming device among the external image forming devices of the pre-registered addresses.

The requesting operation may include receiving a set-up entry name and sending a request signal for set-up entry data having the input set-up entry name to the external image forming devices of the pre-registered addresses.

The job processing method may further include selecting a job of the image forming device when the image forming device is a multifunction printer capable of processing a plurality of jobs. In this case, the requesting operation may request set-up entry data of the selected job to the at least one external image forming device.

The foregoing and/or other aspects and utilities of the general inventive concept may also be achieved by providing an image forming device including an interface portion to obtain setup entry data from one or more external image forming devices and a central processing unit to process an output function based on the set-up entry data obtained from the one or more external image forming devices.

The foregoing and/or other aspects and utilities of the general inventive concept may also be achieved by providing a method of processing a function in a multifunctional printer, the method including selecting one function of a plurality of function from the multifunctional printer and identifying whether an other image forming device has the same function selected from the multifunctional printer.

The foregoing and/or other aspects and utilities of the general inventive concept may also be achieved by providing a computer-readable recording medium having embodied thereon a computer program to execute a method, wherein the method includes requesting set-up entry data to at least one external image forming device and when the set-up entry data is received, processing a job according to the received set-up entry data.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
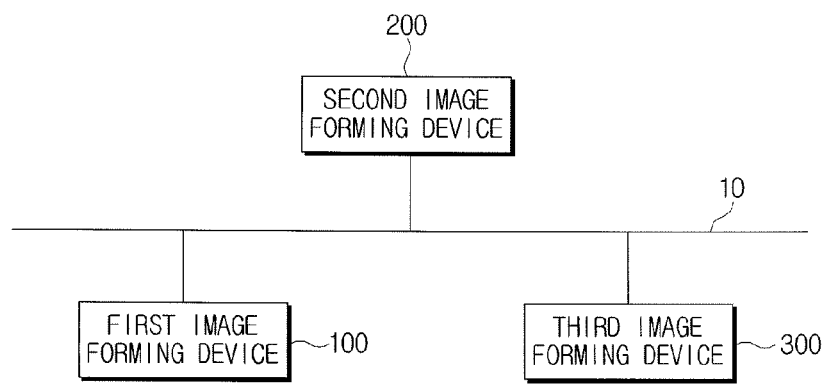
FIG. 1 is a conceptual diagram illustrating a network system structure according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a conceptual diagram illustrating a network system structure according to an embodiment of the present general inventive concept. The network system of FIG. 1 includes a plurality of image forming devices 100, 200, and 300 which are connected over a network 10. The image forming devices 100, 200, and 300 can be implemented using a printer, a scanner, a copier, and a fax machine, or using a multifunction printer having at least two capabilities of the printer, scanner, and copier, and the fax machine.

To use the functions of the image forming devices 100, 200, and 300, users can request and receive set-up entry data set at other image forming devices. Hence, without separately inputting the set-up entry data, subsequent jobs can be executed based on the received set-up entry data.

The function of the image forming devices 100, 200, and 300 indicates at least one of a scanning function, a printing function, a copy function, a fax function, a scan to server message block (SMB) function, scan to E-mail function, and a scan to File Transfer Protocol (FTP) function. The set-up entry data indicates additional data required for a job execution corresponding to the function of the image forming device 100, 200, or 300.

Figure 2:
FIG. 2 is a block diagram illustrating an image forming device according to an embodiment of the present general inventive concept.

FIG. 2 is a block diagram of the first image forming device of the image forming devices in the network system of FIG. 1. While the structure of only the first image forming device 100 is illustrated in FIG. 2, the second and third image forming devices 200 and 300 can be implemented in the same structure as the first image forming device 100.

The first image forming device 100 of FIG. 2 includes an interface portion 110, a communication portion 120, and a central processing unit 130. The interface portion 110 of the first image forming device 100 is responsible to relay communications with the other image forming devices 200 and 300 over the network 10. The interface portion 110 can be implemented using a network interface card, a network port, and so forth.

The communication portion 120 of the first image forming device 100 serves to communicate with the other image forming devices 200 and 300 through the interface portion 110. In more detail, the communication portion 120 is able to request set-up entry data with respect to the other image forming devices 200 and 300. In this case, the set-up entry data can be information relating to a job to be executed at the image forming device 100. For instance, to execute the scan to E-mail job, the received set-up entry data can contain a recipient address, a sender address, a recipient name, a format, and the like.

Upon receiving the set-up entry data from the second or third image forming device 200 or 300, the communication portion 120 provides the received data to the central processing unit 130.

The central processing unit 130 processes the job by applying the received set-up entry data. If the image forming device 100 is the multifunction printer, the central processing unit 130 processes a job selected by the user. Upon receiving the set-up entry data including the recipient address, the sender address, the recipient name, and the format as above, the central processing unit 130 controls a scanning module (not illustrated) to scan a document and then transmits the scanned data to the recipient address according to the received set-up entry data. In doing so, the scanned data is framed into a mail format of the received set-up entry data and transmitted with the written recipient name of the received set-up entry data.

The method for the communication unit 120 to request the set-up entry data to the other image forming devices 200 and 300 can be variously implemented, which will be explained in detail with reference to FIG. 3.

Figure 3:
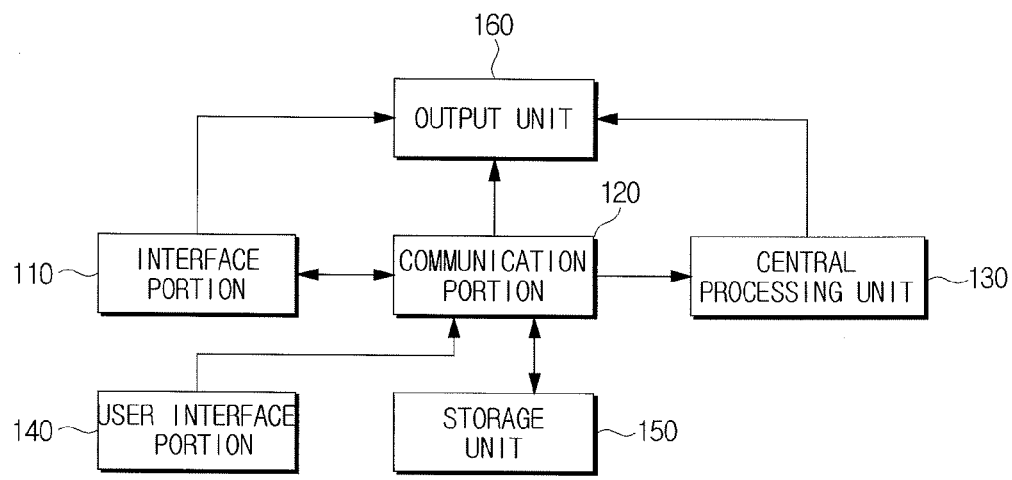
FIG. 3 is a block diagram illustrating an image forming device according to various embodiments of the present general inventive concept.

FIG. 3 is a block diagram illustrating an image forming device according to various embodiments of the present general inventive concept. In addition to an interface portion 110, a communication portion 120, and a central processing unit 130, the image forming device 100 of FIG. 3 further includes a user interface portion 140, a storage unit 150, and an output unit 160.

The user interface portion 140 serves to receive various selection commands from the user.

The storage unit 150 stores an address of a pre-registered image forming device.

The output unit 160 displays various information received through the interface portion 110.

The communication portion 120 of the image forming device 100 is able to search, for example, nearby image forming devices in a broadcast manner. Specifically, when a specific job is selected through the user interface portion 140 or the image forming device 100 is turned on, the communication portion 120 broadcasts an address request signal over the network 10.

Accordingly, the nearby image forming devices 200 and 300 receive the address request signal and transmit a response signal. The response signal contains information relating to addresses of the image forming devices 200 and 300.

Upon receiving the response signal from at least one of the image forming devices 200 and 300, the output unit 160 displays the addresses of the image forming devices 200 and 300 which transmit the response signal, as a list.

The address can include not only an IP address, but text information recorded to inform a user of the actual positions of the image forming devices 200 and 300. For instance, when the user recorded text information "by the side of window on the second floor" with respect to the second image forming device 200 in advance, the response signal can also contain this text information together. Accordingly, the user can easily select that image forming device in the list.

In an embodiment of the present general inventive concept, only addresses of the image forming devices which support a same function of the image forming device 100 in the list can be displayed. Because an image forming device having a different function can not provide the set-up entry data, such an image forming device from the list can be excluded for the sake of the user's convenience.

The communication portion 120 can broadcast the address request signal by including characteristic information of the image forming device 100. Accordingly, it is possible, for example, to induce only an image forming device matching the characteristic information among the other image forming devices 200 and 300 to send a response signal, and to display the address list of the image forming devices having the same functions.

Alternatively, the communication portion 120 can broadcast the address request signal together with a characteristic information request signal. Accordingly, the image forming device 100 can acquire whether the other image forming devices 200 and 300 have the same function by comparing the characteristic information of the response signals with characteristic information from the image forming device 100. The information comparison is performed at the central processing unit 130. The central processing unit 130 controls the output unit 160 to display, for example, only image forming devices having the same characteristic information as the image forming device 100 in the list.

The specific information can be a manufacturer ID, a serial number, a model name, and the like. Typically, since same serial models support similar functions, it is easy to acquire the same function by comparing the characteristic information.

When the address list is displayed by the output unit 160, the user can select at least one of the displayed addresses using the user interface portion 140.

When the address is selected, the communication portion 120 sends a set-up entry list request signal to the selected address. The set-up entry list is a list of the set-up entry data stored to the corresponding image forming device.

When the set-up entry list information is received via the interface portion 110, the output unit 160 displays the set-up entry list according to the received set-up entry list information. The user can select at least one set-up entry using the user interface portion 140. When the set-up entry is selected, the communication portion 120 sends a request signal for the selected set-up entry to the selected address and receives set-up entry data. The received set-up entry data is fed to the central processing unit 130.

According to another embodiment of the present general inventive concept, the request, the reception and the display of the set-up entry list can be omitted. That is, the user can input a set-up entry name in person using the user interface portion 140. The set-up entry name is a name specifying the set-up entry data. As the user sets the set-up entry data, the set-up entry name can be recorded and stored together. When the set-up entry name is input through the user interface portion 140, the communication portion 120 can request the set-up entry data of the input set-up entry name to the selected address, receive and provide the requested data to the central processing unit 130. In this embodiment of the present general inventive concept, the user does not need to check and reselect the set-up entry list.

If the address information of the external image forming device is pre-stored to the storage unit 150, that is, if the address information is pre-registered, the communication portion 120 can utilize the stored address information. That is, it is possible to omit to search the neighboring image forming devices by broadcasting the address request signal. The storage unit 150 may store the address information received through the former broadcasting.

In the embodiment where the pre-registered address information is utilized, the communication portion 120 can receive the set-up entry list by sending the set-up entry list request signal to an image forming device having the address stored to the storage unit 150. Accordingly, the set-up entry selected by the user in the set-up entry list can be requested to and received from the image forming device.

According to still another embodiment of the present general inventive concept, the output unit 160 can display the list of the addresses stored to the storage unit 150. When the user selects one address in the list, the communication portion 120 can send the set-up entry list request signal to the selected address.

Alternatively, rather than to request and receive the set-up entry list, the communication portion 120 can receive the set-up entry data directly by requesting the set-up entry name input by the user through the user interface 140 to the image forming device of the registered address or the selected address.

Figure 4:
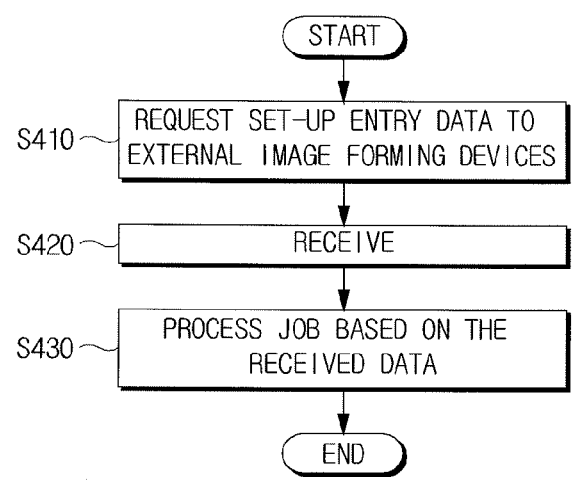
FIGS. 4 and 5 are flowcharts illustrating a job processing method of the image forming device according to embodiments of the present general inventive concept.

FIG. 4 is a flowchart illustrating a job processing method of the image forming device according to an embodiment of the present general inventive concept. In FIG. 4, the image forming device requests set-up entry data to the external image forming devices (operation S410). In more detail, the image forming device can request the set-up entry data to the external image forming devices using the broadcasting scheme or using the pre-stored address. The set-up entry data can be selected from the displayed list, or specifically requested by the user by inputting the set-up entry name in person.

Accordingly, when the requested set-up entry data is received (operation S420), the image forming device executes a job based on the received data (operation S430).

Figure 5:
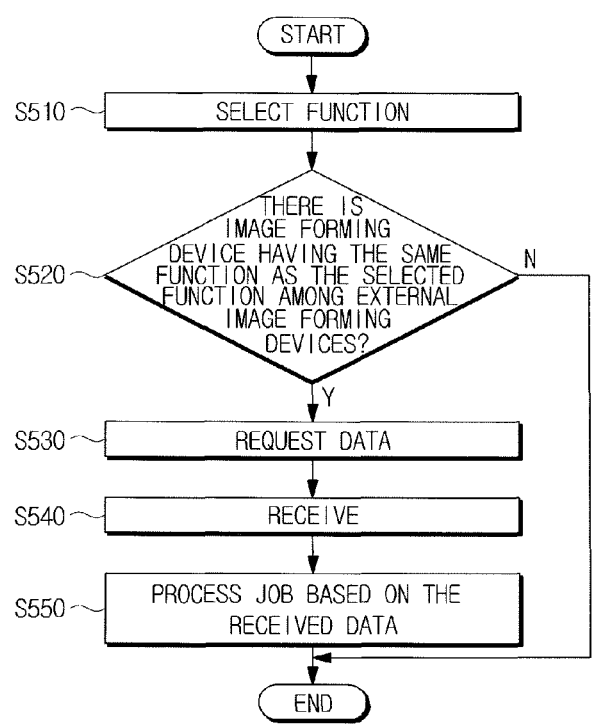

FIG. 5 is a flowchart illustrating a job processing method of the image forming device according to another embodiment of the present general inventive concept. In FIG. 5, when a specific job is selected in a multifunction printer (operation S510), the multifunction printer determines whether an image forming device having a same function as selected among the external image forming devices is present (operation S520). The various determination schemes may be used. For instance, whether an image forming device having the same characteristic information responses or not can be checked by broadcasting characteristic information of the image forming device to nearby image forming devices, or whether an image forming device having the same characteristic information as the multifunction printer is present when characteristic information is received from nearby image forming devices.

When there is the same image forming device, set-up entry data of the corresponding image forming device is requested (operation S530). Upon receiving the requested set-up entry data (operation S540), the multifunction printer executes the selected job according to the received data (operation S550).

Figure 6:
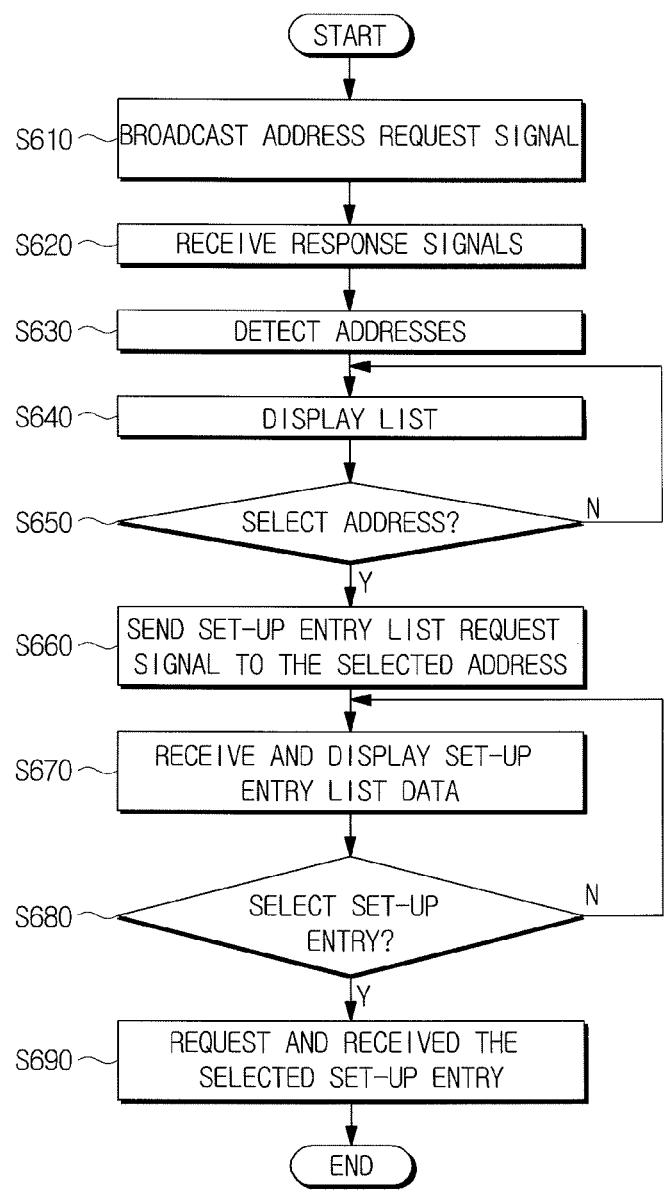
FIGS. 6 and 7 are flowcharts illustrating a method to request the set-up entry data of other image forming devices according to various embodiments of the present general inventive concept.

FIG. 6 is a flowchart illustrating a method to request the set-up entry using the broadcasting scheme in the image forming device. An address request signal is broadcast over the network 10 (operation S610). Response signals for the address request signal are received (operation S620).

Addresses of the image forming devices are detected from the received response signals (operation S630), and a list of the detected addresses is displayed (operation S640).

Next, when at least one of the addresses is selected in the displayed list (operation S650), a set-up entry list request signal is transmitted to the selected address (operation S660).

The set-up entry list data is received and displayed (operation S670).

The user selects his/her desired set-up entry data from the displayed set-up entry list (operation S680). Hence, the image forming device 100 requests the selected set-up entry to the image forming device of the selected address and receives the requested set-up entry data (operation S690).

Figure 7:
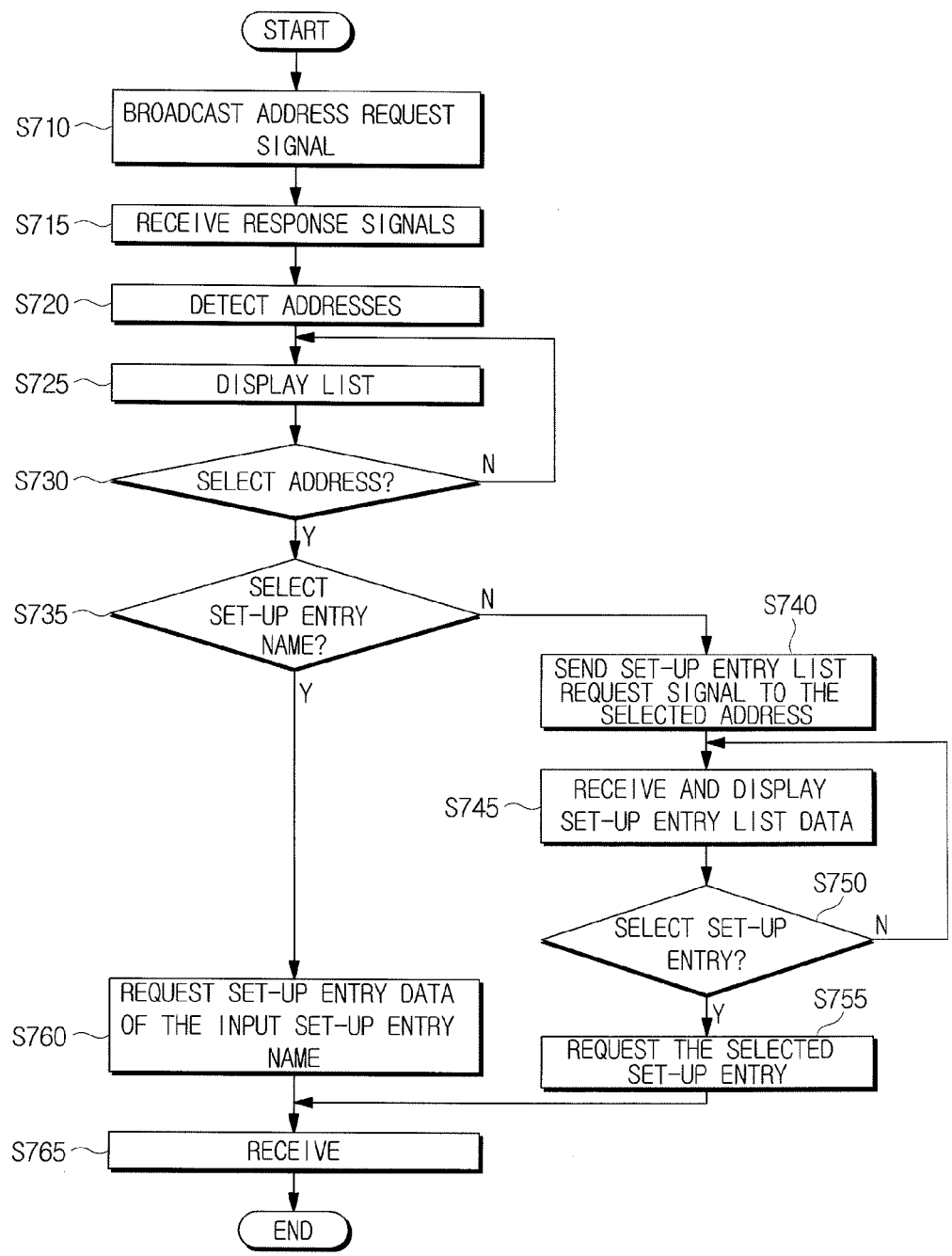

FIG. 7 is a flowchart illustrating another method to request the set-up entry using the broadcasting scheme at the image forming device. In FIG. 7, an address request signal is broadcast (operation S710) and response signals are received (operation S715). Addresses are detected (operation S720) and its address list is displayed (operation S725).

When a specific address is selected (operation S730), the image forming device provides an opportunity of inputting a set-up entry name to be received (operation S735). When the user inputs an intended set-up entry name using the user interface portion 140, the image forming device requests set-up entry data of the input set-up entry name to the selected address (operation S760). Thus, the requested set-up entry data is received (operation S765).

When the user does not input a set-up entry name while the specific address is selected (operation S730), a set-up entry list request signal is transmitted to the selected address (operation S740). The set-up entry list is received and displayed (operation S745).

When at least one set-up entry is selected in the set-up entry list (operation S750), the selected set-up entry is requested (operation S755) and then received (operation S765).

While the set-up entry request process using the broadcast scheme has been explained in FIGS. 6 and 7, the set-up entry data may be requested using the addresses stored to the storage unit 150.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As set forth above, the set-up entry data stored to the other image forming devices can be received and utilized at each image forming device at will. Accordingly, the image forming devices do not need to set the set-up entry data individually, and the duplication of the set-up entry data by the medium such as host PC can be omitted. Consequently, the functions of the image forming devices can be utilized more efficiently and conveniently.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A multifunction printer comprising:
   an interface portion to relay communications with at least one external multifunction printer;
   a communication portion to request set-up entry data to execute a job from the at least one external multifunction printer, the set-up entry data including data required for a job execution corresponding to a function of the multifunction printer capable of executing a plurality of jobs; and
   a central processing unit to execute the job according to the set-up entry data when the requested set-up entry data is received through the interface portion,
   when one of the job is selected, the communication portion requests set-up entry data of the selected job from the at least one external multifunction printer,
   wherein the function of the multifunction printer is at least one of a scanning function, a printing function, a copy function, a fax function, a scan to server message block (SMB) function, a scan to E-mail function, and a scan to File Transfer Protocol (FTP) function.

2. The multifunction printer of claim 1, wherein the communication portion generates an address request signal to request addresses and broadcasts the generated address request signal through the interface portion.

3. The multifunction printer of claim 2, further comprising:
   an output unit to display a list of addresses of external multifunction printers which transmit response signals, when the response signals for the address request signal are received through the interface portion; and
   a user interface portion.

4. The multifunction printer of claim 3, wherein the output unit displays a list of addresses of external multifunction printers having a same function as the multifunction printer among the external multifunction printers which transmit the response signals.

5. The multifunction printer of claim 3, wherein the communication portion sends a set-up entry list request signal to an external multifunction printer having a selected address when the address is selected from the list, and the output unit displays a set-up entry list according to received data when the data relating to the set-up entry list is received in response to the set-up entry list request signal.

6. The multifunction printer of claim 5, wherein, when one set-up entry is selected from the displayed set-up entry list through the user interface portion, the communication portion sends a request signal for the selected set-up entry to an external multifunction printer of the selected address.

7. The multifunction printer of claim 3, wherein, when one address is selected from the list through the user interface portion and a set-up entry name is input, the communication portion sends a request signal for set-up entry data of the input set-entry name to an external multifunction printer having the selected address.

8. The multifunction printer of claim 1, further comprising:
   a storage unit to store addresses of external multifunction printers that are pre-registered,
   wherein the communication portion sends the set-up entry list request signal to the external multifunction printers having the addresses stored to the storage unit.

9. The multifunction printer of claim 8, wherein the communication portion sends the set-up entry list request signal for a same type of external multifunction printers as the multifunction printer among the external multifunction printers having the addresses stored to the storage unit.

10. The multifunction printer of claim 8, further comprising:
    an output unit to display the set-up entry list according to the received data, when data of the set-up entry list is received in response to the set-up entry list request signal; and
    a user interface portion,
    wherein the communication portion, when at least one set-up entry is selected from the displayed set-up entry list through the user interface portion, sends a request signal for the selected set-up entry data to an external multifunction printer having the stored address.

11. The multifunction printer of claim 1, further comprising:
    a storage unit to store addresses of external multifunction printers that are pre-registered; and
    a user interface portion to receive a set-up entry name,
    wherein the communication portion sends a request signal for set-up entry data having the input set-up entry name to an external multifunction printer having the address stored to the storage unit.

12. A job processing method of a multifunction printer, the method comprising:
    requesting set-up entry data to execute a job from at least one external multifunction printer, the set-up entry data including data required for a job execution corresponding to a function of the multifunction printer;
    when the set-up entry data is received, processing a job according to the received set-up entry data,
    selecting a job of the multifunction printer when the multifunction printer is capable of processing a plurality of jobs,
    wherein the requesting operation requests set-up entry data of the selected job from the at least one external multifunction printer,
    wherein the function of the multifunction printer is at least one of a scanning function, a printing function, a copy function, a fax function, a scan to server message block (SMB) function, a scan to E-mail function, and a scan to File Transfer Protocol (FTP) function.

13. The job processing method of claim 12, wherein the requesting operation comprises:
- broadcasting an address request signal to request addresses of multifunction printers;
- when response signals for the address request signal are received, detecting addresses of external multifunction printers which transmit the response signals;
- generating and displaying a list of the detected addresses;
- when one of the addresses is selected from the list, sending a set-up entry list request signal to an external multifunction printer of the selected address;
- receiving data relating to a set-up entry list in response to the set-up entry list request signal;
- displaying the set-up entry list according to the received data; and
- when one set-up entry is selected from the displayed set-up entry list, sending a request signal for the selected set-up entry data to an external multifunction printer of the selected address.

14. The job processing method of claim 12, wherein the requesting operation comprises:
- broadcasting an address request signal to request addresses of multifunction printers;
- when response signals for the address request signal are received, detecting addresses of external multifunction printers which transmit the response signals;
- generating and displaying a list of the detected addresses;
- when one address is selected from the list, receiving a set-up entry name; and
- sending a request signal for set-up entry data of the input set-up entry name to an external multifunction printer of the selected address.

15. The job processing method of claim 13, wherein the list of the detected addresses, which is generated and displayed, is a list relating to external multifunction printers having a same function as the multifunction printer.

16. The job processing method of claim 12, wherein the requesting operation comprises:
- sending a set-up entry list request signal to external multifunction printers having pre-registered addresses;
- receiving data relating to a set-up entry list in response to the set-up entry list request signal;
- displaying the set-up entry list according to the received data; and
- when a set-up entry is selected from the displayed set-up entry list, sending a request signal for the selected set-up entry data to an external multifunction printer of the selected address.

17. The job processing method of claim 16, wherein the sending the set-up entry list request signal comprises:
- transmitting the set-up entry list request signal to an external multifunction printer having a same function as the multifunction printer among the external multifunction printers of the pre-registered addresses.

18. The job processing method of claim 12, wherein the requesting operation comprises:
- receiving a set-up entry name; and
- sending a request signal for set-up entry data having the input set-up entry name to the external multifunction printers having pre-registered addresses.

19. A non-transitory computer-readable recording medium having embodied thereon a computer program to execute a method, wherein the method comprises:
- requesting set-up entry data to execute a job from at least one external multifunction printer, the set-up entry data including data required for a job execution corresponding to a function of the multifunction printer;
- when the set-up entry data is received, processing a job according to the received set-up entry data,
- selecting a job of the multifunction printer when the multifunction printer is capable of processing a plurality of jobs,
- wherein the requesting operation requests set-up entry data of the selected job from the at least one external multifunction printer,
- wherein the function of the multifunction printer is at least one of a scanning function, a printing function, a copy function, a fax function, a scan to server message block (SMB) function, a scan to E-mail function, and a scan to File Transfer Protocol (FTP) function.

* * * * *